United States Patent
Göltenboth

(10) Patent No.: US 8,763,516 B2
(45) Date of Patent: Jul. 1, 2014

(54) DEVICE FOR FEEDING MILK

(75) Inventor: Frank Göltenboth, Blaustein (DE)

(73) Assignee: WMF Wuerttembergische Metallwarenfabrik AG, Geislingen (DE)

( * ) Notice: Subject to any disclaimer, the term of this patent is extended or adjusted under 35 U.S.C. 154(b) by 621 days.

(21) Appl. No.: 11/805,201

(22) Filed: May 22, 2007

(65) Prior Publication Data

US 2008/0053313 A1 Mar. 6, 2008

(30) Foreign Application Priority Data

Jul. 14, 2006 (EP) .................................. 06 014 753

(51) Int. Cl.
*A47J 31/44* (2006.01)
*B67B 7/00* (2006.01)
*B08B 3/00* (2006.01)

(52) U.S. Cl.
USPC .................. 99/290; 99/298; 222/1; 222/148; 134/98.1; 134/170; 134/100.1; 134/166 C; 134/198

(58) Field of Classification Search
USPC ................ 99/290, 298; 134/98.1, 170, 100.1, 134/166 C, 198, 93, 103.1, 167 C; 222/1, 222/148

See application file for complete search history.

(56) References Cited

U.S. PATENT DOCUMENTS

| | | | |
|---|---|---|---|
| 3,132,656 A | | 5/1964 | Rankin |
| 3,486,512 A | * | 12/1969 | Marino ........................... 134/93 |
| 4,192,332 A | * | 3/1980 | Feldmeier ................. 134/167 R |
| 4,452,268 A | * | 6/1984 | Icking et al. .................. 137/240 |
| 5,547,645 A | * | 8/1996 | Ego et al. ...................... 422/264 |
| 6,182,555 B1 | * | 2/2001 | Scheer et al. ................... 99/290 |
| 2007/0240582 A1 | * | 10/2007 | Eimer et al. ................. 99/323.3 |

FOREIGN PATENT DOCUMENTS

| | | |
|---|---|---|
| EP | 0 344 859 A1 | 12/1989 |
| WO | WO-2005/112717 A1 | 12/2005 |

* cited by examiner

*Primary Examiner* — Dana Ross
*Assistant Examiner* — Ket D Dang
(74) *Attorney, Agent, or Firm* — Marshall, Gerstein & Borun LLP

(57) ABSTRACT

A device for feeding milk from a storage container (8) to a dispensing device (3), containing a feeding line (9), whose intake end (9a) is detachably connected to the storage container (8), and with a cleaning possibility for at least a portion of the exterior of the feeding line (9). In order to enhance a device of this type such that the cleaning is simplified, a cleaning mechanism (11) be provided for the exterior of the feeding line (9), which comprises a rinsing area (12) for holding the portion of the feeding line (9) that is to be cleaned. The rinsing area (12) contains a hot water intake opening, a steam intake opening, a cleaning agent intake opening, or cold water intake opening (17), and also a connection opening (14) for the detachable introduction of the portion to be cleaned.

9 Claims, 2 Drawing Sheets

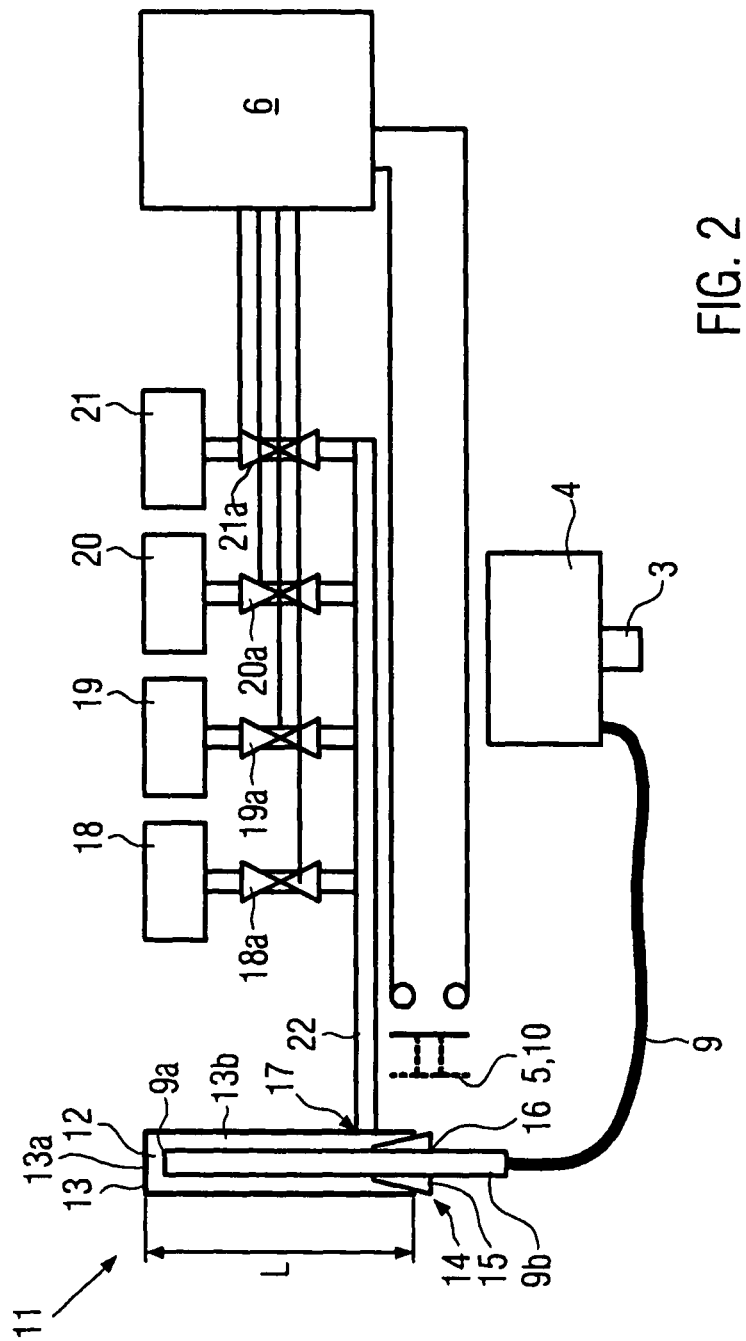

DEVICE FOR FEEDING MILK

CROSS-REFERENCE TO RELATED APPLICATION

The present application claims the benefit of priority of European Patent Application No. EP 06 014 753.5 filed on Jul. 14, 2006. The entire text of the priority application is incorporated herein by reference in its entirety.

FIELD OF THE DISCLOSURE

The disclosure relates to a device for feeding milk such as used in drink-vending and coffee machines.

BACKGROUND OF THE DISCLOSURE

Such a device is known from EP 344 859. The known device serves to dispense heated milk and furthermore contains a frothing device with which the milk can additionally be frothed. Frothing devices for milk using the widest range of active principles are known; in the described device, milk is suctioned in from a storage container, for example, using the Venturi principle. This is done via a feeding line in the form of a hose whose outlet end is connected to the frothing device and whose intake end is simply placed into a storage container for milk. One problem with all devices that handle milk is the cleaning. Milk spoils quickly and therefore the parts that come into contact with the milk should be cleaned and sterilised as often as possible and as thoroughly as possible. This is less of a problem inside the heating and frothing device, because there work is done with steam, so that the frothing device can be relatively simply cleaned by means of a burst of pure steam, without milk being fed, whereby the growth of bacteria is reliably prevented at least until the next thorough cleaning with removal of the parts and/or use of cleaning agents. Because there is no natural path for the steam in the feeding line, however, the feeding line cannot be cleaned in this way, or at least it cannot be adequately cleaned in this way. In the known device, therefore, it is proposed to bring the feeding hose with its intake end into a cleaning liquid in between times and, by activating the device, to suction the cleaning liquid through the feeding line now instead of milk. This is cumbersome, however, and sometimes does not lead to the desired result. For a thorough cleaning of the feeding line, it would also be possible to use hot water just short of the boiling point, which is, however, problematic to handle and not always available. Water that is cold or only warm does not lead to the desired cleaning result. If cleaning agents are used, it is subsequently necessary to rinse laboriously in order to ensure that all residues have been removed from the device.

Furthermore, in order to ensure complete cleaning of the exterior of the feeding hose, the storage container must also be filled with cleaning agent at least to the highest level of the milk in the storage container, which amounts to a waste of cleaning agent in the case of the capacities of milk storage containers of modern coffee machines.

SUMMARY OF THE DISCLOSURE

The object of the disclosure is consequently to enhance a device of the type mentioned in such a way that cleaning is simplified.

The development according to the disclosure allows an exterior cleaning of the feeding line in a simple and expedient manner. As a result of the arrangement of a separate rinsing area, this can be specially adapted to the shape and dimensions of the part of the exterior of the feeding line to be cleaned, so that, on the one hand, it is possible for a thorough cleaning to take place while, on the other hand, however, no cleaning agent is wasted. With the cleaning mechanism according to the disclosure, it is furthermore easily possible to perform a cleaning also with hot water or even with steam, which, from the point of view of hygiene, produces a considerably better cleaning result than cleaning with a simple washing-up liquid.

The device according to the disclosure can be used for milk dispensing devices formed as separate units, for drink vending machines or, especially advantageously, for coffee machines. If a hot water supply and/or steam supply and/or cleaning agent supply and/or cold water supply is available in these devices, such a supply can also be used for the device according to the disclosure and can be connected to the intake opening in the rinsing area.

For a cleaning, e.g., when the milk supply is changed, the user needs only to disconnect the feeding line from the milk storage container, place its dirty section into the rinsing area and initiate a washing/rinsing process.

Preferably, the connection opening in the rinsing area is provided with a seal in order to avoid the escape of cleaning medium, particularly steam, with the associated danger for the user.

A particularly good cleaning effect is reached if the rinsing area is formed in such a way that the part of the feeding line that is to be cleaned can be held in an axially extended position.

The rinsing area should be large enough and the intake opening should be arranged in such a way that a flooding area forms around the part of the feeding line that is held and that the cleaning medium can flow within this flooding area.

The device according to the disclosure is especially suitable for an intermediate cleaning between the cyclic general cleanings of the machine, usually at the end of the day or workweek, or, in the case of larger temperature loading of the milk used, even more frequently, so that preferably an operating element for initiating a cleaning process is provided so that the user can initiate a cleaning process as needed.

If it is ensured that the interior of the rinsing area is also connected to the interior of the feeding line, the interior of the feeding line can also be cleaned at the same time as the exterior. Furthermore, in this way an especially simple possibility for removing the cleaning medium from the rinsing area and conducting it via the dispensing device is created. By means of special insertion markings and/or limit stops, it should be ensured that the part of the feeding line that is held does not extend across the full length of the rinsing area, so that the interior of the feeding line remains in contact with the rinsing area in a simple manner.

If the retaining opening and the intake opening are arranged close to the lowest point of the rinsing area, it is ensured that fresh cleaning medium washes around the entire part of the feeding line that is held. At the same time, this arrangement also simplifies the process of driving out residual cleaning medium after the cleaning and before the feeding line is again removed from the rinsing area.

BRIEF DESCRIPTION OF THE DRAWINGS

One embodiment of the disclosure is explained in more detail in the following, using the drawings. Shown are.

DETAILED DESCRIPTION OF THE DISCLOSURE

Figure 1:
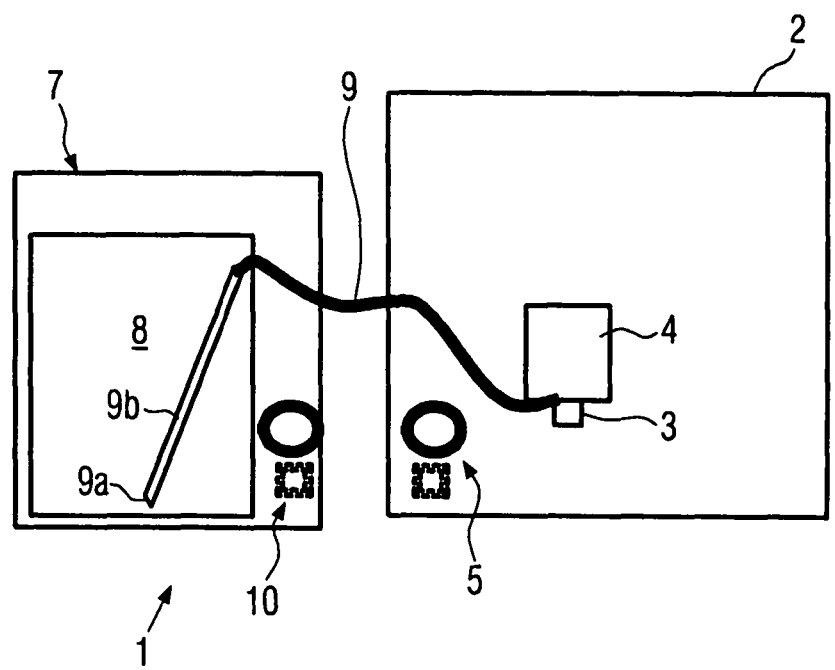
FIG. 1 a heavily schematised depiction of a coffee machine with a device according to the disclosure, and FIG. 2 the device according to the disclosure, in a heavily schematized depiction.

In FIG. 1, a coffee machine is apparent, wherein here, by way of example, the figure shows only a housing 2, an outlet 3 with a milk frothing device 4 arranged in front of it, and an operating panel 5, which is connected to a control mechanism 6. In the depicted embodiment, the coffee machine 1 contains an assigned milk supply 7, which is formed here as a cooling mechanism, in which a storage container 8 for milk is accommodated and cooled. In the depicted embodiment, the milk supply 7 is formed as a separate component outside of the housing 2 of the coffee machine 1. The storage container 8 can however, in a customary manner, also be integrated into the housing 2 or built on to the housing 2.

The storage container 8 is connected to the outlet 3 via a feeding line 9, either directly or via the frothing device 4. The feeding line 9 is detachably attached to the storage container 8 in a suitable manner such that the storage container 8 can be emptied via the feeding line 9. The feeding line 9 is preferably formed, at least over a predetermined portion of its length, as a (flexible) hose, and is immersed with an intake opening 9a into the milk in the storage container 8. The portion of the feeding line 9 that is immersed into the milk is preferably formed as a rigid tube 9b, i.e., as a so-called milk lance, on to which the hose-like portion of the feeding line is attached outside of the storage container 8 or outside of the milk level. Milk lances are somewhat heavier than hoses, so that there is less danger of the suction point being moved upwards from the bottom of the storage container 8. The disclosure can, however, also be used for feeding lines 9 that are also formed as a hose in the interior of the storage container 8.

In the depicted embodiment, the milk supply 7 contains its own operating means 10, which refer, for example, to the functions of the milk supply 7.

The coffee machine 1 furthermore contains supplies of hot water and/or steam and/or cleaning agents and/or cold water and can also have a supply of compressed air that is not depicted. The term "supply" is intended to refer both to the corresponding storage container and to a continuous feed via a feeding line and to corresponding preparers, and for example, hot water and steam preparers, hot water boilers, cold water connections to the mains system, cleaning agent supplies or generators (for example, solution containers for dissolving solid chemical cleaning agents or liquid chemical cleaning agents to be diluted in water or ozone generators or the like). Supplies of this type are commonly found in coffee machines for the catering area.

The coffee machine 1 furthermore contains the cleaning mechanism 11, depicted in more detail in FIG. 2. The cleaning mechanism 11 contains a rinsing area 12, which is accommodated in a housing 13. The housing 13 in the depicted embodiment is formed with a cylindrical, tubular shape. The housing 13 is closed in a pressure-tight manner all around and has a connection opening 14 that breaks through the wall 13. The connection opening 14 is preferably arranged close to the lowest point of the rinsing area 12 and preferably extends across the entire lower front face of the housing 13. Into the connection opening 14 is fit a seal 15, which is penetrated by a retainer bore hole 16 for the feeding line 9. The seal 15 is formed in such a way that no fluid can pass through between the wall 13 and the seal 15 and between the feeding line 9 and the seal 15. The connection opening 14 is preferably formed for a plug-in receptacle for the feeding line 9, i.e., the feeding line 9 can be plugged into the connection opening 14 and held there by friction.

The rinsing area 12 has an axial length L that corresponds at least to that length with which the feeding line 9 is immersed into the highest milk level in the storage container 8, so that the portion of the feeding line 9 to be cleaned, i.e., the intake opening 9a at the free end of the feeding line 9 and the portion that connects to it, can be held when axially extended. At the same time, the intake opening 9a is located at a distance to that face side 13a of the housing 13 that lies opposite the connection opening 14. In the depicted embodiment, the milk lance 9b is longer than the highest milk level, and therefore protrudes out of the rinsing area 12 with its upper end.

The correct position for the feeding line 9 in the rinsing area 12 can be defined by limit stops, for example, by a permanent attachment of the seal 15 to the feeding line 9, or by insertion markings or the like.

Furthermore, an intake opening 17 empties into the rinsing area 12. The intake opening 17 is connected to at least one supply for a cleaning medium. Cold water and/or hot water and/or steam and/or cleaning agent (solid, liquid or gaseous) or the like can be used as the cleaning media in the manner in which they are provided individually in the coffee machine anyway or in the form of a separate supply. Furthermore, the compressed air supply can be connected here or it can be possible to connect such a supply. In the depicted embodiment, the intake opening 17 is connected to a steam supply 18, a cold water supply 19, a hot water supply 20 and a cleaning agent supply 21. Each of these supplies 18 to 21 is connected to a collecting line 22, which empties into the intake opening 17 via a corresponding valve 18a, 19a, 20a, 21a that can be blocked off. The valves 18a to 21a are acted upon by a separate control mechanism or by the control mechanism 6 of the coffee machine 1. The disclosure can, however, be put into use even if not all of the described cleaning media are present or connected to the intake opening 17.

The intake opening 17 extends through the side wall 13b of the housing 13. The intake opening 17 preferably likewise empties close to the lowest point of the rinsing area 12 and preferably at a right angle to the retaining opening 14 and at right angle to the feeding line 9 that is held in the retaining opening 14.

The housing 13 has an inside diameter that is larger than the outer diameter of the portion of the feeding line 9 held in the rinsing area 12, whereby the diameter difference is dimensioned in such a way that a flooding area is formed between the portion of the feeding line 9 that is held and the inner wall of the housing 12, which, on the one hand, ensures that all areas of the exterior of the feeding line 9 that are to be cleaned are reached and, on the other hand, also that there is a mechanical cleaning effect. The rinsing area 12 should, on the one hand, be large enough for a sufficient cleaning agent throughput and, on the other hand, small enough for a sufficient flow rate. Additionally, by means of a suitable arrangement of the intake opening 17, it is possible to ensure that the flow encompasses the entire flooding area largely in a turbulent manner (e.g., cyclone-like development or the like).

If, for example, when the storage container 8 is refilled or changed, an intermediate cleaning is wished or necessary, the user removes the feeding line 9 from the storage container 8 and places it, with the intake opening 9a facing upwards, into the connection opening 14 up to the predetermined depth. Then, an intermediate cleaning process is initiated by means of an operating means that is provided for this purpose and that can be located within the operating field 5 on the housing 2 or within the operating field 10 on the milk supply 7. The cleaning process can be carried out with only one of the cleaning media alone or with expedient combinations, for example, with hot water followed by a burst of steam, with cleaning agent followed by a rinsing with cold or hot water and/or a burst of steam, or by other suitable combinations of cleaning media. Expedient cleaning processes can be stored in the control mechanism 6 and called up by the user as needed, or compiled by the user himself/herself, depending on the degree of dirt and/or depending on the ascertainment as to whether or not milk residues, for example, have dried on to the feeding line or the like.

If the control mechanism opens the corresponding valve or valves 18a to 21a, the corresponding cleaning medium flows under pressure through the collecting line 22 into the intake opening 17, bounces from there against the exterior of the portion of the feeding line 9 that is held and rises upwards in the rinsing area 12, as a result of which the entire exterior of the feeding line 9 that was inserted into the milk in the storage container 8 is made wet with cleaning medium. If the level of the cleaning medium in the rinsing area 12 reaches the intake opening 9a, the cleaning medium also flows through the interior of the feeding line 9 and through the outlet 3. In this process, the interior of the feeding line 9, the areas of the frothing device 4 that come into contact with milk and the outlet 3 are freed of milk residues and sterilized or disinfected. The cleaning can be followed by a rinsing with cold water even in the case that a cleaning agent that would not require a rinsing is used, in order to ensure that the user does not come into contact with drops of the cleaning medium when he/she pulls the feeding line 9 back out of the rinsing area 12 again after the cleaning in order to insert it into a new or refilled storage container 8. A rinsing with cold water can also be useful at the beginning of the cleaning process, in order initially to drive out larger milk residues and to prevent the precipitation of the milk residues through hot water or steam by means of denaturation of the milk proteins. A rinsing of the system with steam at the end of the cleaning process can also be useful, in order to empty the rinsing area 12 and/or the feeding line 9 and/or the dispensing device 3. Air that is under pressure can also be used to this end.

In modification to the described and drawn embodiment, the device according to the disclosure can also be built into a drink vending machine or formed as a stand-alone device for dispensing and frothing milk. The operation can take place both under the control of the coffee machine or the drink vending machine and via an additional control mechanism. The formation of the rinsing area can also be modified; for example, the rinsing area can be provided with an outlet of its own, so that the cleaning medium does not run over the outlet of the coffee machine.

The invention claimed is:

1. Device for feeding milk from a storage container to a dispensing device, with a feeding line, comprising an intake end on the feeding line that is detachably connected to the storage container, a cleaning mechanism provided for at least a portion of the exterior of the feeding line, the cleaning mechanism having a rinsing area accommodated in a housing, the rinsing area for holding the portion of the feeding line that is to be cleaned, the rinsing area containing one of a hot water intake opening, a steam intake opening, a cleaning agent intake opening or a cold water intake opening, the rinsing area also having a connection opening for detachable introduction of the portion to be cleaned, the rinsing area having a flooding area that extends around the portion of the held feeding line that is to be cleaned, the flooding area being formed between the portion of the feeding line held within the rinsing area and an inner wall of the housing, the housing including a side wall and an end face opposing the connection opening, and wherein the intake opening is arranged in the side wall of the housing of the cleaning mechanism.

2. The device according to claim 1, wherein the connection opening is provided with a seal.

3. The device according to claim 1, wherein the rinsing area is formed to hold the feeding line when it is axially extended.

4. The device according to claim 1, wherein the cleaning mechanism is connected to a control mechanism that contains an operating element that is operable by the user in order to initiate a cleaning process.

5. The device according to claim 1, wherein the rinsing area is connected to an interior of the feeding line.

6. The device according to claim 1, wherein the rinsing area has a length that exceeds a length of the portion of the exterior of the feeding line that is to be cleaned.

7. The device of claim 1, wherein the connection opening and the intake opening are arranged adjacent a lowest point of the rinsing area, and the held portion of the feeding line extends upwards.

8. Coffee machine with one of a hot water supply, steam supply, cleaning agent supply, and cold water supply and a device for feeding milk from a storage container to a dispensing device, with a feeding line, comprising an intake end on the feeding line that is detachably connected to the storage container, a cleaning mechanism provided for at least a portion of the exterior of the feeding line, the cleaning mechanism having a rinsing area accommodated in a housing, the rinsing area for holding the portion of the feeding line that is to be cleaned, the rinsing area containing one of a hot water intake opening, a steam intake opening, a cleaning agent intake opening or a cold water intake opening, the rinsing area also having a connection opening for detachable introduction of the portion to be cleaned, the rinsing area having a flooding area that extends around the portion of the held feeding line that is to be cleaned, the flooding area being formed between the portion of the feeding line held within the rinsing area and an inner wall of the housing, the housing including a side wall and an end face opposing the connection opening, wherein the intake opening is arranged in the side wall of the housing of the cleaning mechanism, and wherein the one of the hot water supply, steam supply, cleaning agent supply, and cold water supply is connected to the intake opening.

9. The coffee machine according to claim 8, and a control mechanism with an operating element that is operable by the user to initiate a cleaning process.

* * * * *